US012639607B2

(12) United States Patent
Iijima

(10) Patent No.: US 12,639,607 B2
(45) Date of Patent: May 26, 2026

(54) EXPECTED VALUE CALCULATION SYSTEM, EXPECTED VALUE CALCULATION APPARATUS, AND EXPECTED VALUE CALCULATION METHOD

(71) Applicant: Fujitsu Limited, Kawasaki (JP)

(72) Inventor: Naoki Iijima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 13 days.

(21) Appl. No.: 18/798,586

(22) Filed: Aug. 8, 2024

(65) Prior Publication Data

US 2025/0103933 A1     Mar. 27, 2025

(30) Foreign Application Priority Data

Sep. 27, 2023     (JP) ................................. 2023-165202

(51) Int. Cl.
  *G06N 10/20*          (2022.01)
  *G06N 10/70*          (2022.01)
  *G06N 10/80*          (2022.01)
(52) U.S. Cl.
  CPC ............. *G06N 10/20* (2022.01); *G06N 10/70* (2022.01); *G06N 10/80* (2022.01)
(58) Field of Classification Search
  CPC ......... G06N 10/20; G06N 10/70; G06N 10/80
  USPC ........ 326/1, 7; 706/15, 25; 714/52, 746, 774
  See application file for complete search history.

(56) References Cited

U.S. PATENT DOCUMENTS

| | | |
|---|---|---|
| 2022/0198315 A1 | 6/2022 | Wang et al. |
| 2023/0072535 A1 | 3/2023 | Upadhyay |
| 2023/0121176 A1 | 4/2023 | Zhang et al. |
| 2023/0196172 A1 | 6/2023 | Paetznick et al. |
| 2023/0385677 A1 | 11/2023 | Rosenkranz et al. |

FOREIGN PATENT DOCUMENTS

| | | |
|---|---|---|
| JP | 2022-126618 | 8/2022 |
| JP | 2023-035941 | 3/2023 |
| JP | 2023-039444 | 3/2023 |

OTHER PUBLICATIONS

Endo et al, Hybrid Quantum-Classical Algorithms and Quantum Error Mitigation, Journal of the Physical Society of Japan 90, 032001 (Feb. 2021) (Year: 2021).*

* cited by examiner

*Primary Examiner* — Arnold M Kinkead
(74) *Attorney, Agent, or Firm* — Fujitsu Intellectual Property Center

(57)          ABSTRACT

An expected value calculation system includes: a quantum computer that calculates an expected value of a calculation target by using a quantum circuit; an update circuit that obtains a specific parameter by performing, a predetermined number of times, update processing in which the expected value is acquired from the quantum computer, an updated parameter is obtained by updating a parameter of the quantum circuit based on the expected value, and the quantum computer is controlled so as to calculate the expected value by using the quantum circuit to which the updated parameter is applied; and a calculation circuit that calculates the expected value with higher accuracy than that of the quantum computer by using the quantum circuit to which the specific parameter is applied.

14 Claims, 14 Drawing Sheets

301

301

401

EXPECTED VALUE CALCULATION SYSTEM, EXPECTED VALUE CALCULATION APPARATUS, AND EXPECTED VALUE CALCULATION METHOD

CROSS-REFERENCE TO RELATED APPLICATION

This application is based upon and claims the benefit of priority of the prior Japanese Patent Application No. 2023-165202, filed on Sep. 27, 2023, the entire contents of which are incorporated herein by reference.

FIELD

The embodiment discussed herein is related to an expected value calculation technique using a quantum computer.

BACKGROUND

A quantum computer is a computer that achieves calculation by using a phenomenon of quantum mechanics. The quantum computer may calculate an expected value of a calculation target by using a quantum circuit that is a quantum calculation model in which a quantum algorithm is described.

Regarding the quantum computer, a noise removing method of a quantum device is known.

Japanese Laid-open Patent Publication No. 2022-126618 is disclosed as related art.

SUMMARY

According to an aspect of the embodiments, an expected value calculation system includes: a quantum computer that calculates an expected value of a calculation target by using a quantum circuit; an update circuit that obtains a specific parameter by performing, a predetermined number of times, update processing in which the expected value is acquired from the quantum computer, an updated parameter is obtained by updating a parameter of the quantum circuit based on the expected value, and the quantum computer is controlled so as to calculate the expected value by using the quantum circuit to which the updated parameter is applied; and a calculation circuit that calculates the expected value with higher accuracy than that of the quantum computer by using the quantum circuit to which the specific parameter is applied.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

As an example of the quantum computer, a noisy intermediate-scale quantum (NISQ) device is known. The NISQ device is a medium-scale quantum computer using about several tens to several hundreds of quantum bits.

Since a quantum error is insufficiently corrected or not corrected at all in the NISQ device, calculation results of expected values vary due to the influence of noise. The influence of noise depends on the size of a quantum circuit that is a quantum calculation model in which a quantum algorithm is described. For example, the size of a quantum circuit is represented by the number of quantum bits and the number of gates.

Such problem occurs not only in expected value calculation by the NISQ device, but also in expected value calculation by various quantum computers affected by noise.

In one aspect, an object of the present disclosure is to improve the calculation accuracy of expected value calculation using a quantum computer.

Hereinafter, an embodiment will be described in detail with reference to the drawings.

A variational quantum algorithm (VQA) is known as a variational algorithm for a NISQ device. The VQA is an algorithm that alternately uses a quantum computer and a classical computer. The VQA is used in various fields such as quantum chemical calculation and combinatorial optimization problems.

Figure 1:
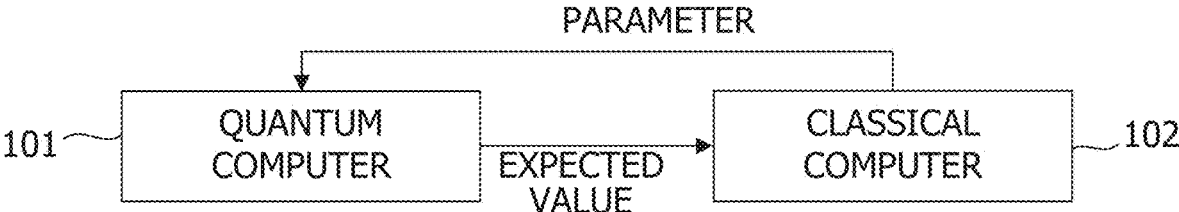
FIG. 1 is a diagram illustrating a first variational quantum algorithm (VQA)

FIG. 1 illustrates an example of a first VQA. A quantum computer 101 calculates an expected value of a calculation target by executing calculation of a quantum circuit. For example, in the case of quantum chemical calculation, physical quantities such as the ground energy of a molecule and the position of an electron are used as calculation targets.

A classical computer 102 acquires the expected value output from the quantum computer 101, and updates a parameter of the quantum circuit based on the acquired expected value. The classical computer 102 outputs the updated parameter to the quantum computer 101. The quantum computer 101 sets the updated parameter in the quantum circuit, and executes calculation of the quantum circuit again.

By repeating such update processing until the expected value converges, a quantum circuit may be generated in which an appropriate parameter is set. Since the quantum computer 101 and the classical computer 102 are alternately used in the VQA, expected value calculation may be performed even in a case where the quantum computer 101 is a NISQ device using a relatively small quantum circuit.

However, in the case where the quantum computer 101 is a NISQ device, the accuracy of an expected value output from the quantum computer 101 decreases due to the influence of noise. In this case, since it is difficult to determine whether the expected value has converged based on the expected value with low accuracy, optimization of a parameter by the classical computer 102 is difficult. As the scale of a quantum circuit increases, the degree of decrease in the accuracy of expected value increases.

Accordingly, in order to reduce the decrease in the accuracy of expected value, a quantum simulator may be used instead of the quantum computer 101. A quantum simulator is a program that simulates calculation of a quantum bit by the quantum computer 101 in a classical computer, and may perform calculation of a quantum bit without noise. A quantum simulator may also be referred to as a quantum computer simulator.

Figure 2:
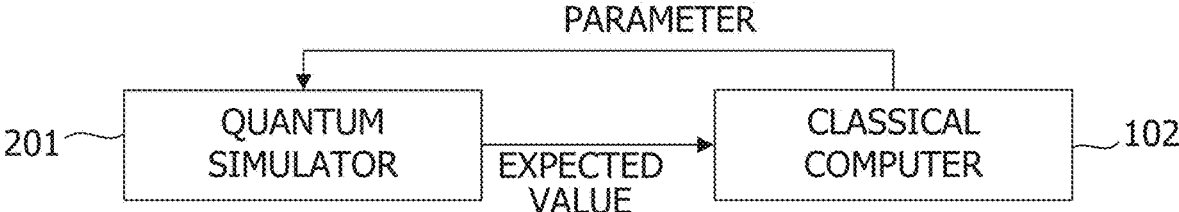
FIG. 2 is a diagram illustrating a second VQA.

FIG. 2 illustrates an example of a second VQA. In the VQA in FIG. 2, a quantum simulator 201 is used instead of the quantum computer 101 in FIG. 1. The quantum simulator 201 calculates an expected value of a calculation target by executing calculation of a quantum circuit.

The classical computer 102 acquires the expected value output from the quantum simulator 201, and updates a parameter of the quantum circuit based on the acquired expected value. The classical computer 102 inputs the updated parameter to the quantum simulator 201. The quantum simulator 201 sets the updated parameter in the quantum circuit, and executes calculation of the quantum circuit again.

Since expected value calculation without noise may be performed by using the quantum simulator 201, the accuracy of expected value is improved. Therefore, optimization of a parameter by the classical computer 102 is facilitated.

However, since the load of expected value calculation by the quantum simulator 201 is large, the calculation time exponentially increases as the number of quantum bits increases. For this reason, expected value calculation that takes a long time is repeated until the expected value converges.

Figure 3:
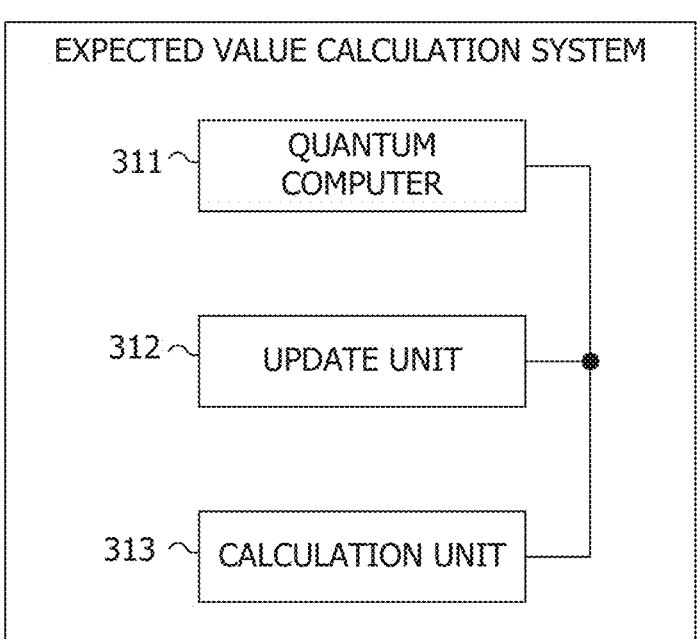
FIG. 3 is a functional configuration diagram of an expected value calculation system of an embodiment.

FIG. 3 illustrates a functional configuration example of an expected value calculation system of the embodiment. An expected value calculation system 301 in FIG. 3 includes a quantum computer 311, an update unit 312, and a calculation unit 313. The quantum computer 311 calculates an expected value of a calculation target by using a quantum circuit.

The update unit 312 performs update processing in which an expected value is acquired from the quantum computer 311, an updated parameter is obtained by updating a parameter of a quantum circuit based on the expected value, and the quantum computer is controlled so as to calculate an expected value by using the quantum circuit to which the updated parameter is applied. The update unit 312 obtains a specific parameter by performing the update processing a predetermined number of times.

The calculation unit 313 calculates an expected value with higher accuracy than that of the quantum computer 311 by using the quantum circuit to which the specific parameter is applied.

According to the expected value calculation system in FIG. 3, the calculation accuracy of expected value calculation using a quantum computer may be improved.

Figure 4:
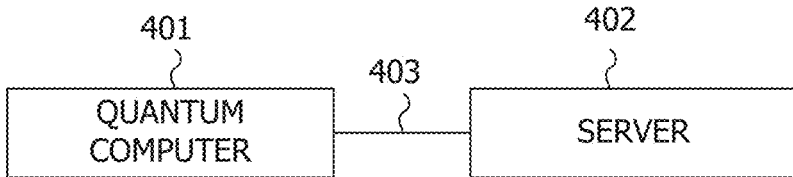
FIG. 4 is a configuration diagram of a first quantum computer system of the embodiment.

FIG. 4 illustrates a configuration example of a first quantum computer system of the embodiment. The quantum computer system in FIG. 4 corresponds to the expected value calculation system 301 in FIG. 3, and calculates an expected value of a calculation target by using the VQA. As the VQA, a variational quantum eigensolver (VQE), a quantum approximate optimization algorithm (QAOA), a quantum neural network (QNN), or the like is used.

The quantum computer system in FIG. 4 includes a quantum computer 401 and a server 402. The quantum computer 401 and the server 402 are hardware. The quantum computer 401 corresponds to the quantum computer 311 in FIG. 3, and is, for example, a NISQ device. The server 402 is a classical computer.

The server 402 communicates with the quantum computer 401 via a communication line 403. First, the server 402 transmits, to the quantum computer 401, an initial value of each of a plurality of quantum bits and information on a quantum circuit corresponding to a calculation target.

The quantum computer 401 obtains the value of each quantum bit indicating the expected value of the calculation target by performing the quantum bit operation indicated by the information on the quantum circuit for the initial value of each quantum bit. The quantum computer 401 transmits the obtained value of each quantum bit to the server 402.

The server 402 updates a parameter of the quantum circuit based on the expected value indicated by the received value of each quantum bit, and transmits information on the quantum circuit including the updated parameter to the quantum computer 401.

The quantum computer 401 obtains the value of each quantum bit indicating the expected value of the calculation target by performing the quantum bit operation indicated by the information on the quantum circuit including the updated parameter for the initial value of each quantum bit. Accordingly, the expected value of the calculation target is updated.

By repeating such update processing a plurality of times, the server 402 determines the parameter value of the quantum circuit. The server 402 calculates the expected value of the calculation target by a quantum simulator using the quantum circuit to which the determined parameter value is applied.

Figure 5:
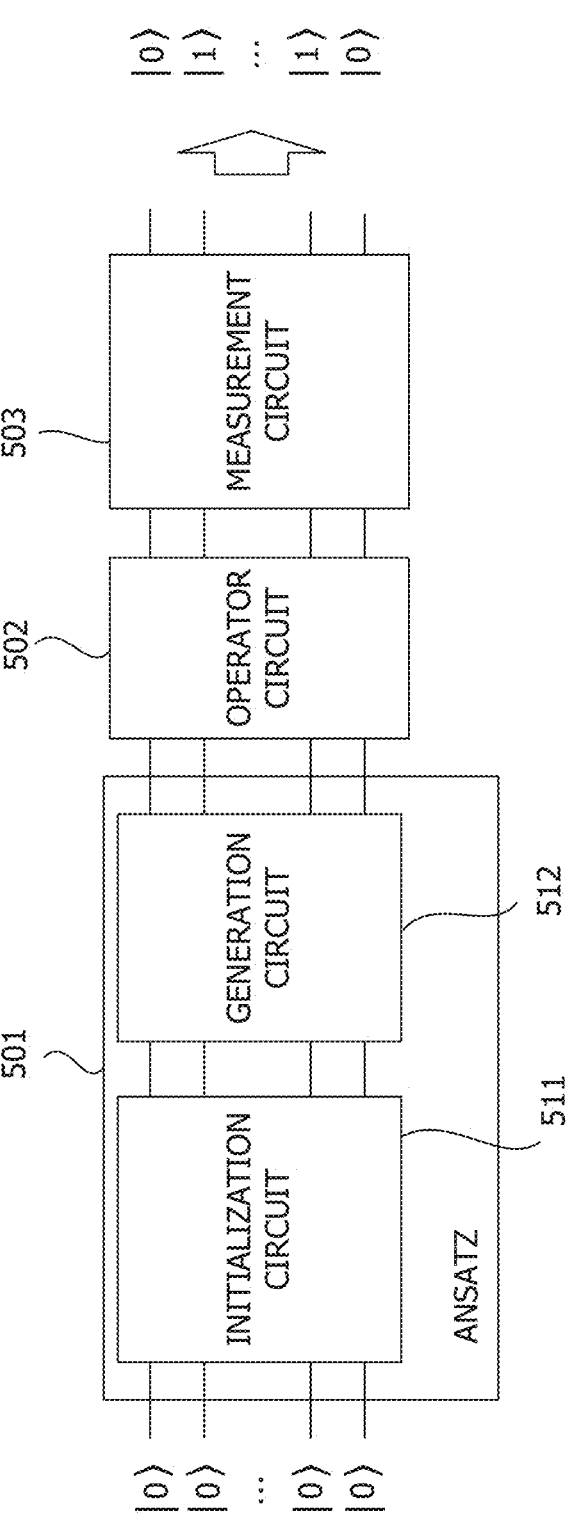
FIG. 5 is a diagram illustrating a quantum circuit.

FIG. 5 illustrates an example of a quantum circuit. The quantum circuit in FIG. 5 includes an ansatz 501, an operator circuit 502, and a measurement circuit 503. The ansatz 501 includes an initialization circuit 511 and a generation circuit 512, and generates a quantum state by using a parameter of the quantum circuit. The ansatz 501 is an example of a first circuit, and the operator circuit 502 is an example of a second circuit.

The initialization circuit 511 sets an initial value for each quantum bit. In the example of FIG. 5, the initial value of each quantum bit is logical value "0". The generation circuit 512 includes a plurality of quantum gates, and generates a trial state from the initial value of each of a plurality of quantum bits. A trial state represents a quantum state that is a trial function of the VQA. Each quantum gate of the generation circuit 512 performs quantum bit operation according to rotation angle θ. Rotation angle θ has a different value for each quantum gate. Rotation angle θ is an example of the parameter of the quantum circuit.

The operator circuit 502 includes a plurality of quantum gates representing an operator of a calculation target, and calculates an expected value of the operator from the trial state generated by the ansatz 501. The measurement circuit 503 measures the expected value calculated by the operator circuit 502, and outputs the value of each quantum bit indicating the measured expected value. The value of each quantum bit to be output is logical value "0" or logical value "1".

For example, in quantum chemical calculation, in a case where the calculation target is the ground energy of a molecule, the trial state corresponds to an electronic state of the molecule, and the operator of the calculation target corresponds to the Hamiltonian of energy of the molecule. In a combinatorial optimization problem, in a case where the calculation target is the maximum value or the minimum value of an objective function, the trial state corresponds to a solution candidate, and the operator of the calculation target corresponds to the objective function.

Figure 6:
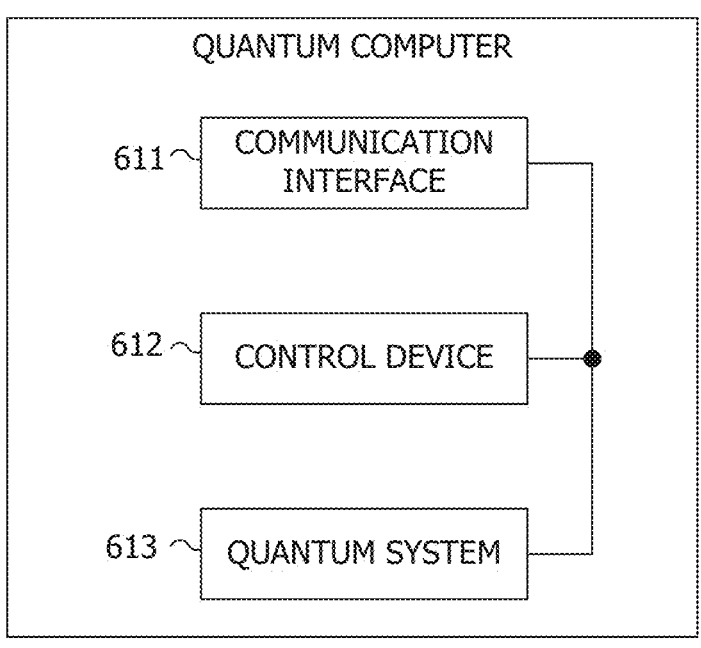
FIG. 6 is a hardware configuration diagram of a quantum computer.

FIG. 6 illustrates a hardware configuration example of the quantum computer 401 in FIG. 4. The quantum computer 401 in FIG. 6 includes a communication interface 611, a control device 612, and a quantum system 613. These constituent elements are hardware.

The communication interface 611 is a communication circuit that is coupled to the communication line 403 and performs data conversion through communication. The quantum system 613 includes a quantum device that realizes a plurality of quantum bits.

The communication interface 611 receives an initial value of each of a plurality of quantum bits and information on a quantum circuit from the server 402, and outputs the initial values and information to the control device 612. The control device 612 generates a control signal by using the initial value of each quantum bit and the information on the quantum circuit, and outputs the control signal to the quantum system 613.

The quantum system 613 obtains the value of each quantum bit indicating an expected value of a calculation target from the initial value of each quantum bit by performing quantum bit operation in accordance with the control signal. The control device 612 transmits the value of each quantum bit obtained by the quantum system 613 to the server 402 via the communication interface 611.

After that, the communication interface 611 receives information on the quantum circuit including an updated parameter from the server 402, and outputs the information to the control device 612. For example, the information on the quantum circuit including the updated parameter is information on the generation circuit 512 in which the updated rotation angle θ is set. The control device 612 generates a control signal by using the initial value of each quantum bit and the information on the quantum circuit, and outputs the control signal to the quantum system 613.

The quantum system 613 obtains the value of each quantum bit indicating the updated expected value from the initial value of each quantum bit by performing quantum bit operation in accordance with the control signal. The control device 612 transmits the value of each quantum bit obtained by the quantum system 613 to the server 402 via the communication interface 611.

Figure 7:
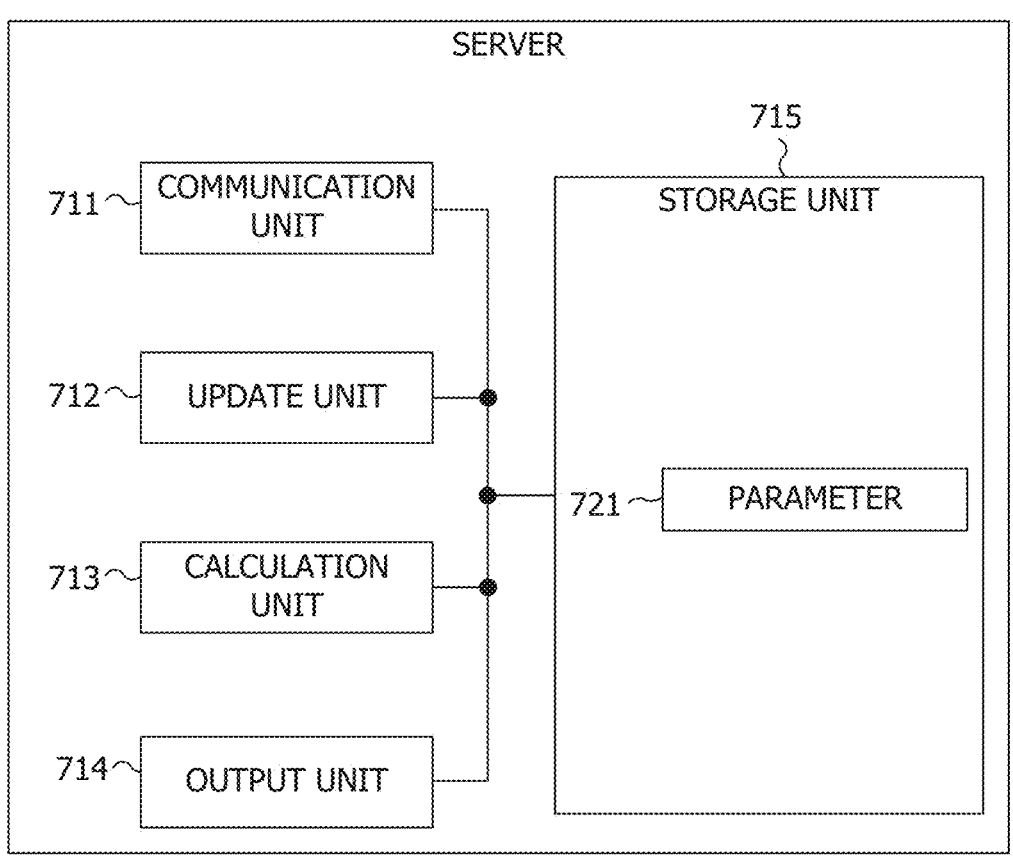
FIG. 7 is a first functional configuration diagram of a server.

FIG. 7 illustrates a first functional configuration example of the server 402 in FIG. 4. The server 402 in FIG. 7 includes a communication unit 711, an update unit 712, a calculation unit 713, an output unit 714, and a storage unit 715. The update unit 712 and the calculation unit 713 correspond to the update unit 312 and the calculation unit 313 in FIG. 3, respectively.

The communication unit 711 communicates with the quantum computer 401 via the communication line 403. The storage unit 715 stores a parameter 721 of a quantum circuit.

First, the update unit 712 transmits, to the quantum computer 401 via the communication unit 711, an initial value of each of a plurality of quantum bits and information on the quantum circuit including an initial value of the parameter 721. The update unit 712 acquires an expected value from the quantum computer 401 by receiving the value of each quantum bit indicating the expected value of a calculation target from the quantum computer 401 via the communication unit 711.

Next, the update unit 712 updates the parameter 721 such that the expected value is close to an optimal value based on the expected value indicated by the value of each quantum bit. The update unit 712 may update the parameter 721 by using a gradient method such as the steepest descent method. For example, the optimal value of expected value may be the minimum value of energy of a molecule, or may be the maximum value or the minimum value of an objective function.

Next, the update unit 712 controls the quantum computer 401 to calculate an expected value using the quantum circuit to which the updated parameter 721 is applied by transmitting information on the quantum circuit including the updated parameter 721 to the quantum computer 401. The update unit 712 receives the value of each quantum bit indicating the updated expected value from the quantum computer 401.

By repeating such update processing a plurality of times, the update unit 712 determines the final value of the parameter 721. The update unit 712 may determine, as the final value, the value of the parameter 721 obtained when the expected value has converged, or may determine, as the final value, the value of the parameter 721 obtained by repeating the update processing a specified number of times.

By repeating the update processing until the expected value converges, the final value of the parameter 721 is closer to the optimal value than in a case where the update processing is ended before the expected value converges. The final value of the parameter 721 is an example of a specific parameter.

Next, the calculation unit 713 calculates the expected value of the calculation target by a quantum simulator using the quantum circuit to which the final value of the parameter 721 is applied. Since the quantum simulator is not affected by the noise in the quantum computer 401, an expected value may be calculated with higher accuracy than that of the quantum computer 401. Expected value calculation using the quantum simulator is executed only once.

The output unit 714 outputs the expected value calculated by the calculation unit 713. In the case of a combinatorial optimization problem, the output unit 714 outputs the maximum value or the minimum value of an objective function as an expected value, and also outputs a solution corresponding to the expected value.

Figure 8:
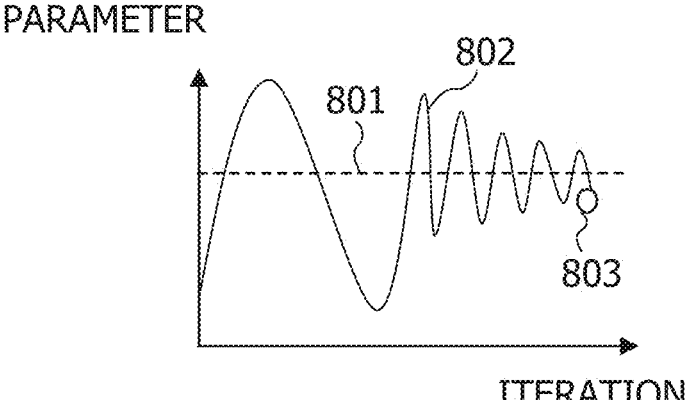
FIG. 8 is a diagram illustrating a change in parameter.

FIG. 8 illustrates an example of a change in the parameter 721 in FIG. 7. In this example, the quantum computer 401 is a NISQ device. The horizontal axis represents the number of times of iteration of the update processing, and the vertical axis represents the value of the parameter 721. A broken line 801 represents the optimal value of the parameter 721 corresponding to the optimal value of expected value, and a curved line 802 represents a change in the parameter 721 caused by iteration of the update processing.

In this example, a final value 803 of the parameter 721 obtained by repeating the update processing a plurality of times is close to the optimal value indicated by the broken line 801, and the error between the final value 803 and the optimal value is small. As described above, even in a case where it is difficult to determine whether an expected value has converged, the final value 803 of the parameter 721 is often close to the optimal value by repeating the update processing a plurality of times.

Figure 9A:
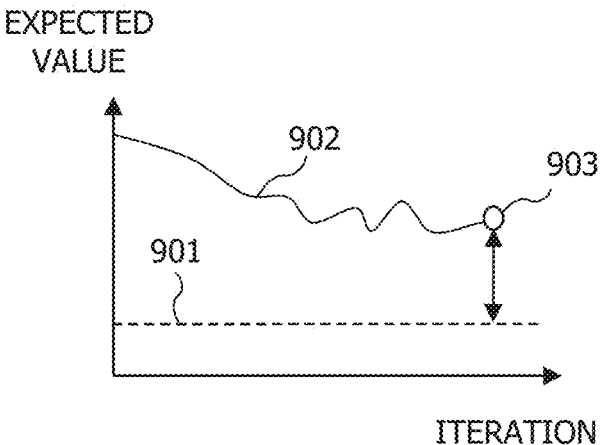
FIGS. 9A and 9B are diagrams illustrating expected values calculated using a parameter.
Figure 9B:
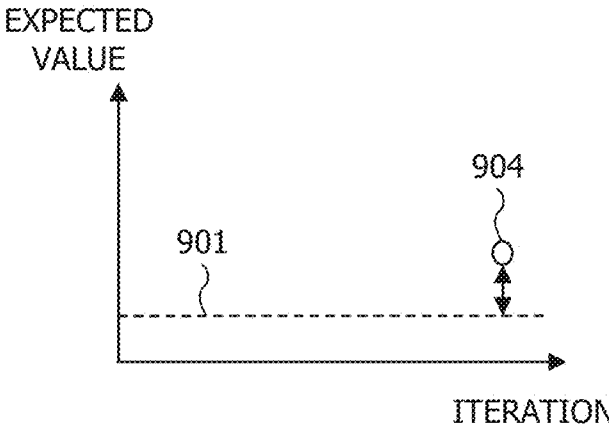

FIGS. 9A and 9B illustrate examples of expected values calculated using the parameter 721. FIG. 9A illustrates an example of an expected value that changes with the change in the parameter 721 illustrated in FIG. 8. The horizontal axis represents the number of times of iteration of the update processing, and the vertical axis represents expected value. A broken line 901 represents the optimal value of expected value, and a curved line 902 represents a change in the expected value calculated by the quantum computer 401 in accordance with the iteration of the update processing.

In this example, due to the influence of the noise in the quantum computer 401, the error between an expected value 903 obtained by repeating the update processing a plurality of times and the optimal value indicated by the broken line 901 is large. As described above, in the case where the quantum computer 401 is a NISQ device, even when the final value 803 of the parameter 721 is close to the optimal value, the accuracy of the expected value 903 calculated by the quantum computer 401 using the final value 803 decreases due to the influence of noise.

FIG. 9B illustrates an example of an expected value calculated by a quantum simulator using a quantum circuit to which the final value 803 of the parameter 721 is applied. The horizontal axis represents the number of times of iteration of the update processing, and the vertical axis represents expected value. The broken line 901 represents the optimal value of expected value, and an expected value 904 represents the expected value calculated by the quantum simulator after the iteration of the update processing has ended.

Since the expected value 904 is not affected by the noise in the quantum computer 401, the error between the expected value 904 and the optimal value indicated by the broken line 901 is smaller than the error between the expected value 903 and the optimal value in FIG. 9A. As described above, even in the case where the quantum computer 401 is a NISQ device, when the final value 803 of the parameter 721 is close to the optimal value, the accuracy of the expected value 904 calculated by the quantum simulator using the final value 803 increases.

Even in a case where the final value of the parameter 721 is not very close to the optimal value, the accuracy of the expected value calculated by the quantum simulator is higher than the accuracy of the expected value calculated by the quantum computer 401 using the same final value. Therefore, according to the quantum computer system in FIG. 4, the accuracy of a calculated expected value is improved by performing expected value calculation by a quantum simulator without noise using the final value of the parameter 721 obtained by the VQA.

Figure 10:
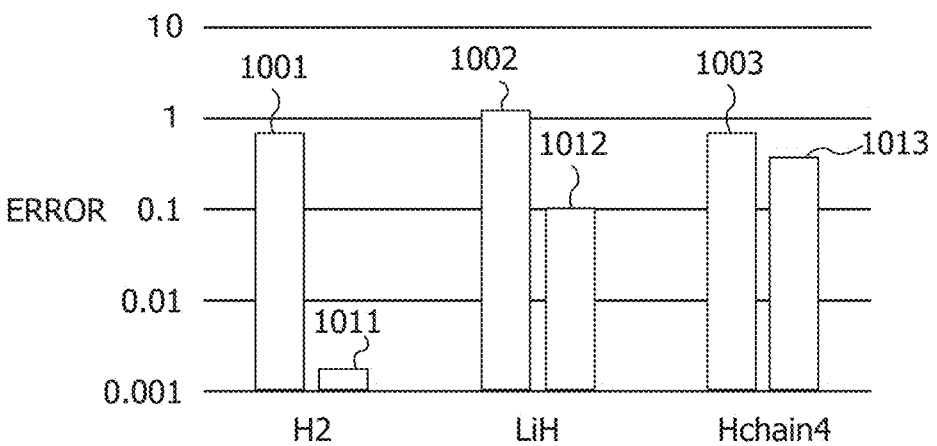
FIG. 10 is a diagram illustrating a calculation result of the ground energy of molecules.

FIG. 10 illustrates an example of a calculation result of the ground energy of molecules in quantum chemical calculation. The vertical axis represents error (hartree) between a calculated expected value and an optimal value. H2 represents a hydrogen molecule in which two hydrogen atoms are bonded, LiH represents a molecule of lithium hydride, and Hchain4 represents a molecule in which four hydrogen atoms are bonded.

In this example, the parameter 721 is updated using the VQE. sto-3g is used as a basis function representing an electronic state, and unitary coupled-cluster singles and doubles (UCCSD) is used as an ansatz. Simultaneous perturbation stochastic approximation (SPSA) is used as an optimization method.

Bars 1001, 1002, and 1003 represent errors of expected values calculated by the quantum computer 401 using the final value of the parameter 721. Bars 1011, 1012, and 1013 represent errors of expected values calculated by a quantum simulator using the final value of the parameter 721.

The error represented by the bar 1011 is smaller than the error represented by the bar 1001, the error represented by the bar 1012 is smaller than the error represented by the bar 1002, and the error represented by the bar 1013 is smaller than the error represented by the bar 1003. Therefore, for all the molecules, the accuracy of the expected value of ground energy is improved by performing expected value calculation by the quantum simulator.

Figure 11:
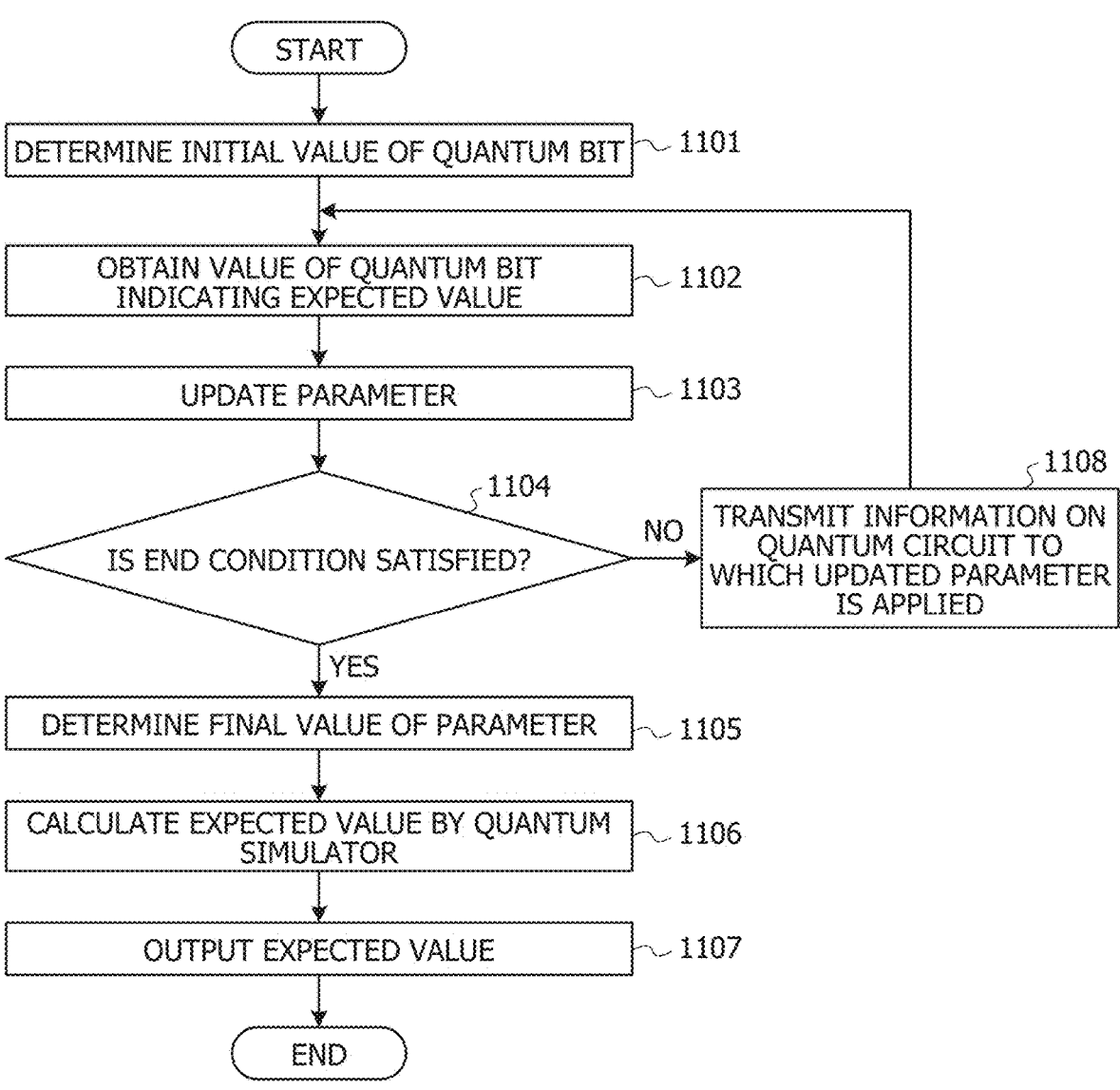
FIG. 11 is a flowchart of expected value calculation processing.

FIG. 11 is a flowchart illustrating an example of expected value calculation processing performed by the quantum computer system in FIG. 4. First, the update unit 712 of the server 402 determines an initial value of each of a plurality of quantum bits, and transmits, to the quantum computer 401, the initial value of each quantum bit and information on a quantum circuit including an initial value of the parameter 721 (step 1101).

Next, the quantum computer 401 obtains the value of each quantum bit indicating an expected value of a calculation target from the initial value of each quantum bit by performing quantum bit operation using the information on the quantum circuit (step 1102). The quantum computer 401 transmits the value of each quantum bit indicating the expected value to the server 402.

The update unit 712 of the server 402 updates the parameter 721 such that the expected value is close to an optimal value based on the expected value indicated by the value of each quantum bit (step 1103), and checks whether an end condition is satisfied (step 1104).

The end condition may be a condition indicating that the expected value has converged, or may be a condition indicating that the number of times the parameter 721 has been updated has reached a specified number of times. For example, when a difference between the expected value indicated by the value of each quantum bit and an expected value indicated by the value of each quantum bit received in the past is smaller than a predetermined value, the update unit 712 determines that the expected value has converged. For example, the specified number of times is an integer of one or more.

When the end condition is not satisfied (NO in step 1104), the update unit 712 transmits information on the quantum circuit including the updated parameter 721 to the quantum computer 401 (step 1108).

The quantum computer 401 obtains the value of each quantum bit indicating the updated expected value from the initial value of each quantum bit by performing quantum bit operation using the information on the quantum circuit including the updated parameter 721 (step 1102). The quantum computer system repeats the processing of step 1103 and subsequent steps.

When the end condition is satisfied (YES in step 1104), the update unit 712 determines the updated parameter 721 as the final value (step 1105).

Next, the calculation unit 713 acquires the final value of the parameter 721 from the storage unit 715, and calculates the expected value of the calculation target by a quantum simulator using the quantum circuit to which the final value is applied (step 1106). The output unit 714 outputs the expected value calculated by the calculation unit 713 (step 1107). The output unit 714 may also output a solution corresponding to the expected value.

Figure 12:
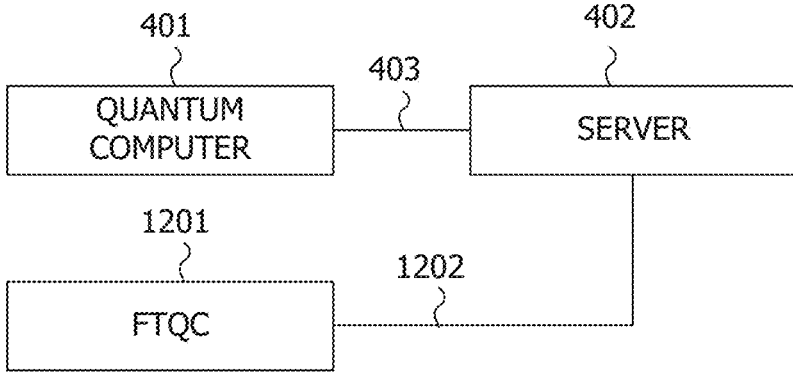
FIG. 12 is a configuration diagram of a second quantum computer system of the embodiment.

FIG. 12 illustrates a configuration example of a second quantum computer system of the embodiment. The quantum computer system in FIG. 12 corresponds to the expected value calculation system 301 in FIG. 3, and has a configuration in which a fault tolerant quantum computer (FTQC) 1201 is added to the quantum computer system in FIG. 4. The FTQC 1201 is hardware, and is a quantum computer having an error correction function. The FTQC 1201 corresponds to the calculation unit 313 in FIG. 3.

The server 402 communicates with the FTQC 1201 via a communication line 1202. By repeating update processing similar to that in the quantum computer system in FIG. 4 a plurality of times, the server 402 determines the parameter value of a quantum circuit. The server 402 transmits, to the FTQC 1201, an initial value of each quantum bit and information on the quantum circuit including the determined parameter value.

The FTQC 1201 obtains the value of each quantum bit indicating an expected value of a calculation target by performing the quantum bit operation indicated by the information on the quantum circuit for the initial value of each quantum bit. The FTQC 1201 transmits the obtained value of each quantum bit to the server 402.

Since the FTQC 1201 has an error correction function unlike the quantum computer 401, an expected value may be calculated with higher accuracy than that of the quantum computer 401. Expected value calculation by the FTQC 1201 is executed only once. The hardware configuration of the FTQC 1201 is similar to the hardware configuration of the quantum computer 401 in FIG. 6.

In the case of a combinatorial optimization problem, the FTQC 1201 also transmits, to the server 402, the value of each quantum bit indicating a solution corresponding to the expected value.

Figure 13:
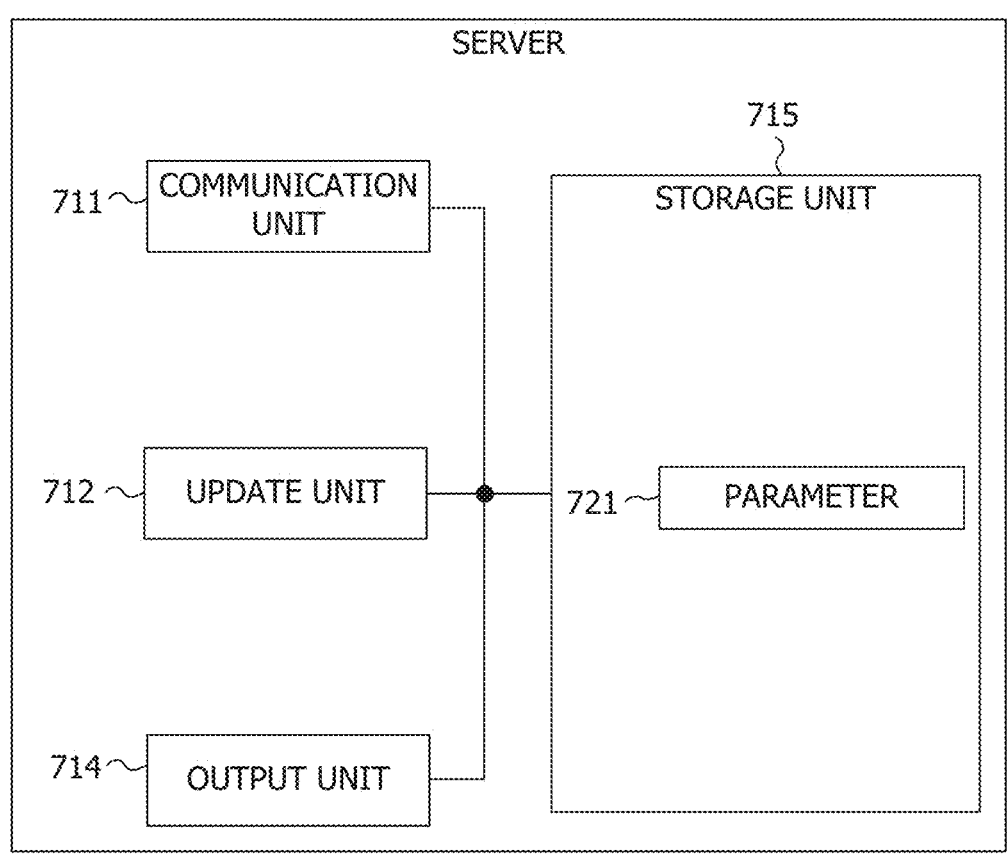
FIG. 13 is a second functional configuration diagram of the server.

FIG. 13 illustrates a second functional configuration example of the server 402 in FIG. 12. The server 402 in FIG. 13 has a configuration in which the calculation unit 713 is deleted from the server 402 in FIG. 7. The communication unit 711 communicates with the FTQC 1201 via the communication line 1202.

By repeating update processing similar to that in the quantum computer system in FIG. 4 a plurality of times, the update unit 712 determines the final value of the parameter 721. The update unit 712 transmits, to the FTQC 1201 via the communication unit 711, an initial value of each quantum bit and information on a quantum circuit including the final value of the parameter 721.

The update unit 712 receives, from the FTQC 1201 via the communication unit 711, the value of each quantum bit indicating an expected value of a calculation target, and acquires the expected value indicated by the value of each quantum bit. The output unit 714 outputs the acquired expected value.

In the case of a combinatorial optimization problem, the update unit 712 also receives, from the FTQC 1201, the value of each quantum bit indicating a solution corresponding to the expected value, and acquires the solution indicated by the value of each quantum bit. The output unit 714 also outputs the acquired solution.

The configuration of the expected value calculation system 301 in FIG. 3 is merely an example, and some constituent elements may be omitted or changed according to the application or conditions of the expected value calculation system.

The configuration of the quantum computer system in FIGS. 4 and 12 is merely an example, and some constituent elements may be omitted or changed according to the application or conditions of the quantum computer system. The configuration of the quantum computer 401 in FIG. 6 is merely an example, and some constituent elements may be omitted or changed according to the application or conditions of the quantum computer system. The configuration of the server 402 in FIGS. 7 and 13 is merely an example, and some constituent elements may be omitted or changed according to the application or conditions of the quantum computer system.

The flowchart in FIG. 11 is merely an example, and part of the processing may be omitted or changed according to the configuration or conditions of the quantum computer system.

The VQAs illustrated in FIGS. 1 and 2 are merely examples. The VQA may be implemented by another method. The quantum circuit illustrated in FIG. 5 is merely an example, and a quantum circuit varies depending on the calculation target. The parameter 721 illustrated in FIG. 8 and the expected values illustrated in FIGS. 9A and 9B are merely examples, and the parameter 721 and expected value to be calculated vary depending on the calculation target. The calculation result illustrated in FIG. 10 is merely an example, and a calculation result of ground energy varies depending on the molecule.

Figure 14:
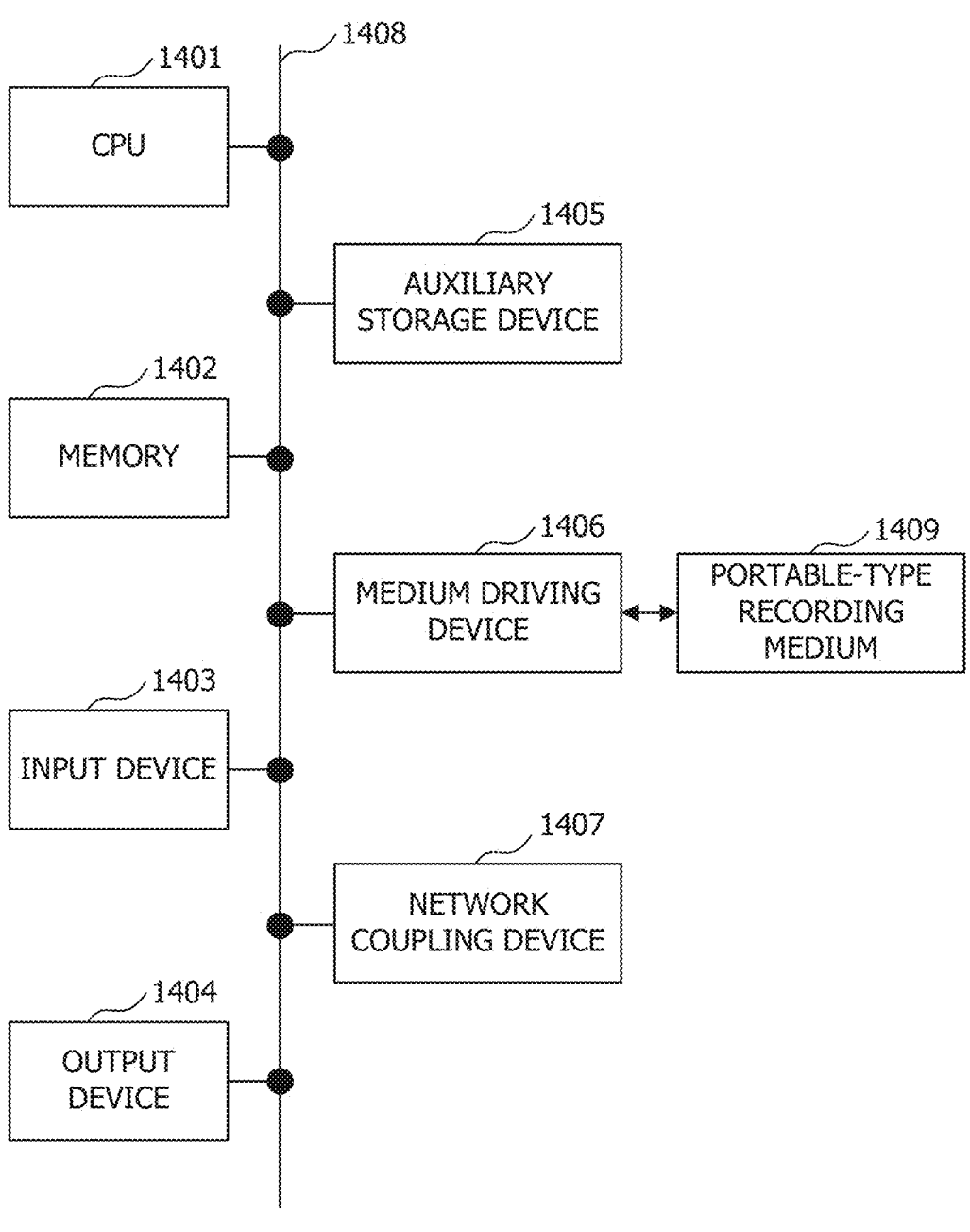
FIG. 14 is a hardware configuration diagram of an information processing device.

FIG. 14 illustrates a hardware configuration example of an information processing device (computer) used as the server 402 in FIGS. 7 and 13. The information processing device in FIG. 14 includes a central processing unit (CPU) 1401, a memory 1402, an input device 1403, an output device 1404, an auxiliary storage device 1405, a medium driving device 1406, and a network coupling device 1407. These constituent elements are hardware, and are coupled to each other by a bus 1408.

For example, the memory 1402 is a semiconductor memory such as a read-only memory (ROM) or a random-access memory (RAM), and stores a program and data used for processing. The memory 1402 may operate as the storage unit 715 in FIGS. 7 and 13.

For example, the CPU 1401 (processor) operates as the update unit 712 in FIGS. 7 and 13 and the calculation unit 713 in FIG. 7 by executing a program using the memory 1402.

For example, the input device 1403 is a keyboard, a pointing device, or the like, and is used to input information or an instruction from a user or operator. For example, the output device 1404 is a display device, a printer, or the like, and is used to output a processing result and an inquiry or instruction to a user or operator. The processing result may be an expected value of a calculation target. The output device 1404 may operate as the output unit 714 in FIGS. 7 and 13.

For example, the auxiliary storage device 1405 is a magnetic disk device, an optical disk drive, a magneto-optical disk device, a tape device, or the like. The auxiliary storage device 1405 may be a hard disk drive or a solid-state drive (SSD). The information processing device may store programs and data in the auxiliary storage device 1405, and use the programs and data by loading them to the memory 1402. The auxiliary storage device 1405 may operate as the storage unit 715 in FIGS. 7 and 13.

The medium driving device 1406 drives a portable-type recording medium 1409, and accesses the contents recorded therein. The portable-type recording medium 1409 is a memory device, a flexible disk, an optical disk, a magneto-optical disk, or the like. The portable-type recording medium 1409 may be a compact disk read-only memory (CD-ROM), a Digital Versatile Disk (DVD), a Universal Serial Bus (USB) memory, or the like. A user or operator may store programs and data in the portable-type recording medium 1409, and use the programs and data by loading them to the memory 1402.

As described above, a computer-readable recording medium in which programs and data used for processing are stored is a physical (non-transitory) recording medium such as the memory 1402, the auxiliary storage device 1405, or the portable-type recording medium 1409.

The network coupling device 1407 is a communication circuit that is coupled to the communication line 403 and the communication line 1202 and performs data conversion through communication. The network coupling device 1407 may operate as the output unit 714 in FIGS. 7 and 13. The information processing device may receive programs and data from an external device via the network coupling device 1407, and use the programs and data by loading them to the memory 1402.

The information processing device does not have to include all the constituent elements in FIG. 14, and some constituent elements may be omitted according to the application or conditions of the information processing device. For example, in a case where an interface with a user or operator does not have to be used, the input device 1403 and the output device 1404 may be omitted. In a case where the portable-type recording medium 1409 is not used, the medium driving device 1406 may be omitted.

Although the disclosed embodiment and its advantages have been described in detail, those skilled in the art would be able to make various changes, additions, and omissions without deviating from the scope of the present disclosure clearly described in the claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An expected value calculation system comprising:
a first quantum computer configured to calculate an expected value of a calculation target by using a quantum circuit for parameter optimization, the first quantum computer being subject to noise influence during said calculation;
an update circuit configured to:
(a) obtain the expected value from the first quantum computer;
(b) obtain an updated parameter by updating a parameter of the quantum circuit based on the acquired expected value;
(c) control the first quantum computer so as to calculate the expected value by using the quantum circuit to which the updated parameter is applied;
(d) repeat the steps (a) to (c) a predetermined number of times to obtain a specific parameter; and
a calculation circuit configured to calculate the expected value with higher accuracy than that of the first quantum computer by applying the specific parameter obtained by the update circuit to the quantum circuit, the calculation circuit operating substantially free from noise influence.

2. The expected value calculation system according to claim 1, wherein the calculation circuit calculates the expected value by using a quantum simulator.

3. The expected value calculation system according to claim 1, wherein
the calculation circuit is a second quantum computer that has an error correction function.

4. The expected value calculation system according to claim 1, wherein
the update circuit obtains, as the specific parameter, a parameter obtained when the expected value acquired from the first quantum computer has converged.

5. The expected value calculation system according to claim 1, wherein
the quantum circuit includes a first circuit that generates a quantum state by using a parameter of the quantum circuit and a second circuit that calculates the expected value from the quantum state.

6. An expected value calculation apparatus coupled to a first quantum computer configured to calculate an expected value of a calculation target by using a quantum circuit for parameter optimization, the first quantum computer being subject to noise influence during said calculation, the expected value calculation apparatus comprising:
an update circuit configured to:
(a) obtain the expected value from the first quantum computer;
(b) obtain an updated parameter by updating a parameter of the quantum circuit based on the acquired expected value;
(c) control the first quantum computer so as to calculate the expected value by using the quantum circuit to which the updated parameter is applied;
(d) repeat the steps (a) to (c) a predetermined number of times to obtain a specific parameter; and
a calculation circuit configured to calculate the expected value with higher accuracy than that of the first quantum computer by applying the specific parameter obtained by the update circuit to the quantum circuit, the calculation circuit operating substantially free from noise influence.

7. The expected value calculation apparatus according to claim 6, wherein
the processor calculates the expected value by using a quantum simulator.

8. The expected value calculation apparatus according to claim 6, wherein
the processor obtains, as the specific parameter, a parameter obtained when the expected value acquired from the first quantum computer has converged.

9. The expected value calculation apparatus according to claim 6, wherein
the quantum circuit includes a first circuit that generates a quantum state by using a parameter of the quantum circuit and a second circuit that calculates the expected value from the quantum state.

10. An expected value calculation method implemented by an expected value calculation apparatus coupled to a first quantum computer configured to calculate an expected value of a calculation target by using a quantum circuit for parameter optimization, the first quantum computer being subject to noise influence during said calculation, the expected value calculation apparatus including an update circuit and a calculation circuit, the expected value calculation method comprising:
(a) the update circuit obtaining the expected value from the first quantum computer;

(b) the update circuit obtaining an updated parameter by updating a parameter of the quantum circuit based on the acquired expected value;

(c) the update circuit controlling the first quantum computer so as to calculate the expected value by using the quantum circuit to which the updated parameter is applied;

(d) the update circuit repeating the steps (a) to (c) a predetermined number of times to obtain a specific parameter; and (e) the calculation circuit calculating the expected value with higher accuracy than that of the first quantum computer by using the quantum circuit to which the specific parameter is applied.

11. The expected value calculation method according to claim 10, further comprising:

calculating the expected value by using a quantum simulator.

12. The expected value calculation method according to claim 10, wherein:

the computer is a second quantum computer that has an error correction function.

13. The expected value calculation method according to claim 10, further comprising:

obtaining, as the specific parameter, a parameter obtained when the expected value acquired from the first quantum computer has converged.

14. The expected value calculation method according to claim 10, wherein the quantum circuit includes a first circuit that generates a quantum state by using a parameter of the quantum circuit and a second circuit that calculates the expected value from the quantum state.

* * * * *